United States Patent [19]

Fullerton

[11] Patent Number: 5,324,150
[45] Date of Patent: Jun. 28, 1994

[54] QUICK ACTING NUT OR COUPLING ASSEMBLY

[76] Inventor: Robert L. Fullerton, 5401 Longley La. #42, Reno, Nev. 89511

[21] Appl. No.: 68,010

[22] Filed: May 27, 1993

Related U.S. Application Data

[63] Continuation of Ser. No. 952,481, Sep. 25, 1992, abandoned, which is a continuation of Ser. No. 788,582, Nov. 6, 1991, abandoned.

[51] Int. Cl.$^5$ .................. F16B 37/08; F16B 39/36; F16L 35/00
[52] U.S. Cl. ...................... 411/433; 411/267; 285/34
[58] Field of Search ............ 411/266, 267, 270, 433, 411/935, 935.1; 285/34, 35

[56] References Cited

U.S. PATENT DOCUMENTS

| | | | |
|---|---|---|---|
| 2,021,051 | 11/1935 | Desbrueres . | |
| 2,896,496 | 7/1959 | Jansen . | |
| 3,157,215 | 11/1964 | Zahodiakin | 411/267 |
| 3,352,341 | 11/1967 | Schertz | 411/270 |
| 3,695,139 | 10/1972 | Howe | 411/433 |
| 3,870,332 | 3/1975 | Eaton | 285/35 |
| 4,172,606 | 10/1979 | Howe | 285/34 |
| 4,378,187 | 3/1983 | Fullerton | 411/267 |

Primary Examiner—Neill R. Wilson
Attorney, Agent, or Firm—Haverstock, Medlen & Carroll

[57] ABSTRACT

A threaded fastener has a casing enclosing at least three radially inwardly biased arcuate segments positioned to engage the threads of a bolt or hollow threaded member. The casing defines spaced apart internal frustoconical surfaces positioned to engage corresponding surfaces of the segments in the same axial direction. The radially inner ends of the frustoconical surfaces are directed toward a first end of the fastener, and the diameter of the radially inner end of the frustoconical surface away from the first end of the fastener is less than the radially outer diameter of the other frustoconical surface. The threads of the segments substantially fully engage the threads of the bolt or hollow threaded member.

19 Claims, 6 Drawing Sheets

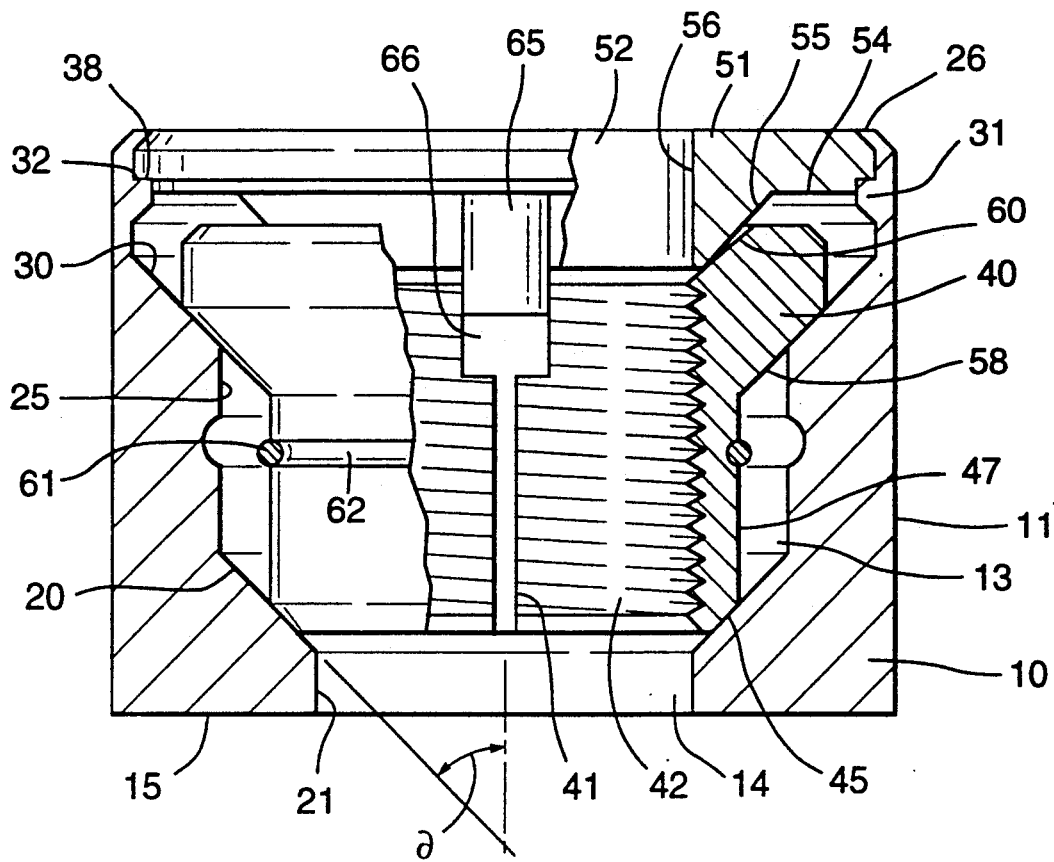
FIG. 1
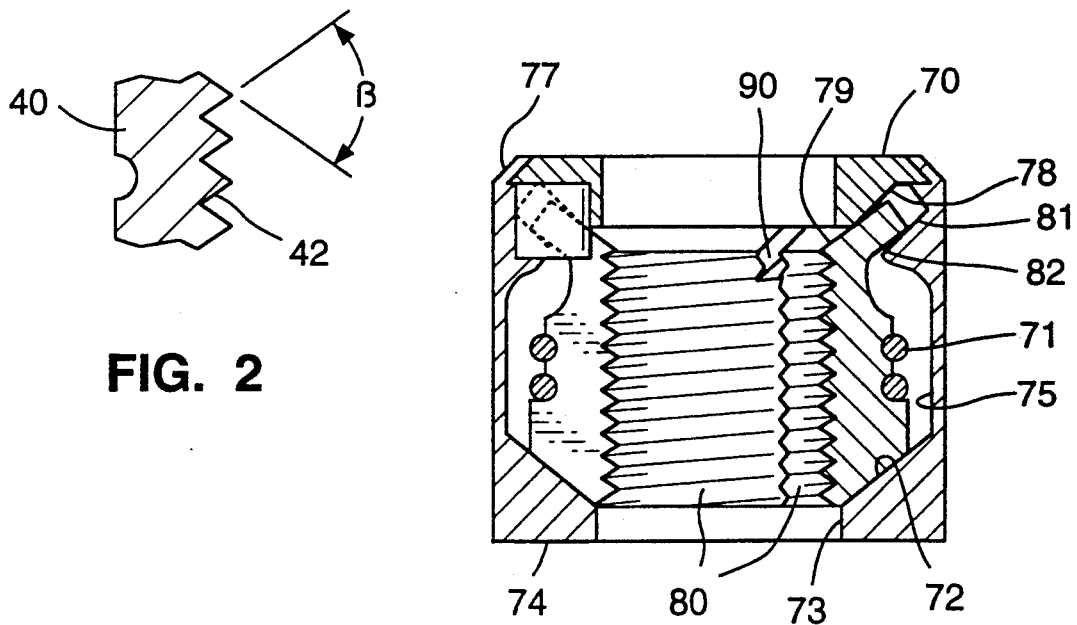
FIG. 2
FIG. 3

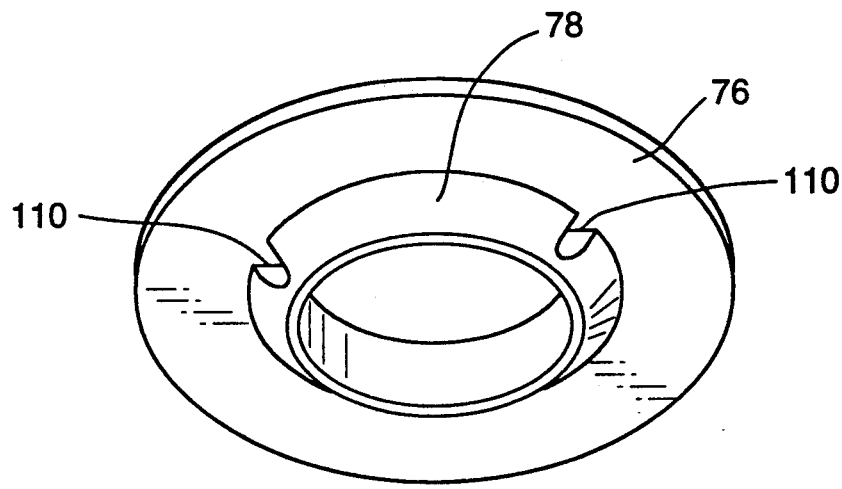
FIG. 7
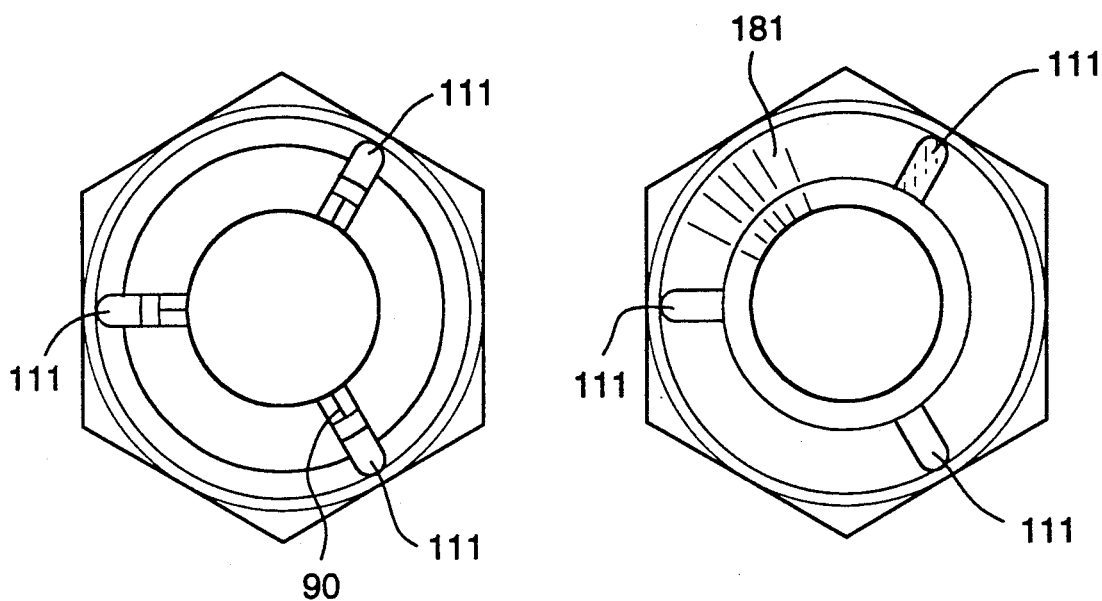
FIG. 8  FIG. 9
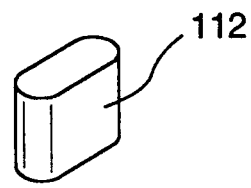
FIG. 10

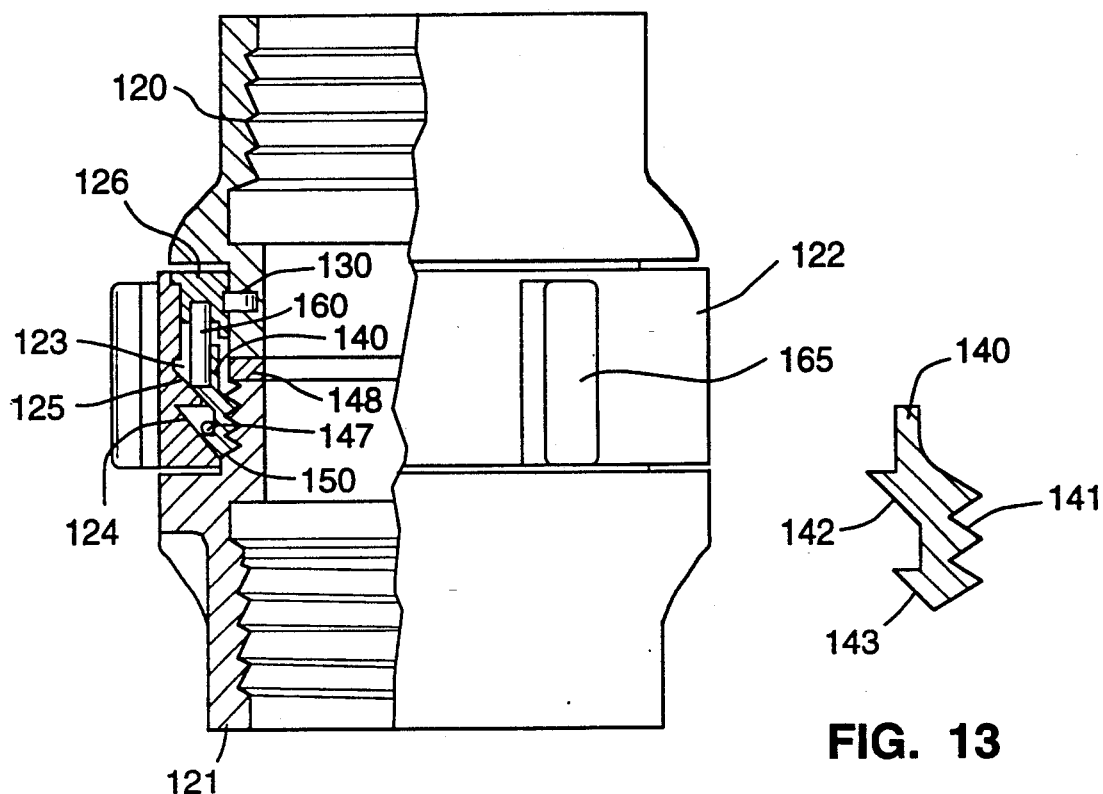
FIG. 11
FIG. 13
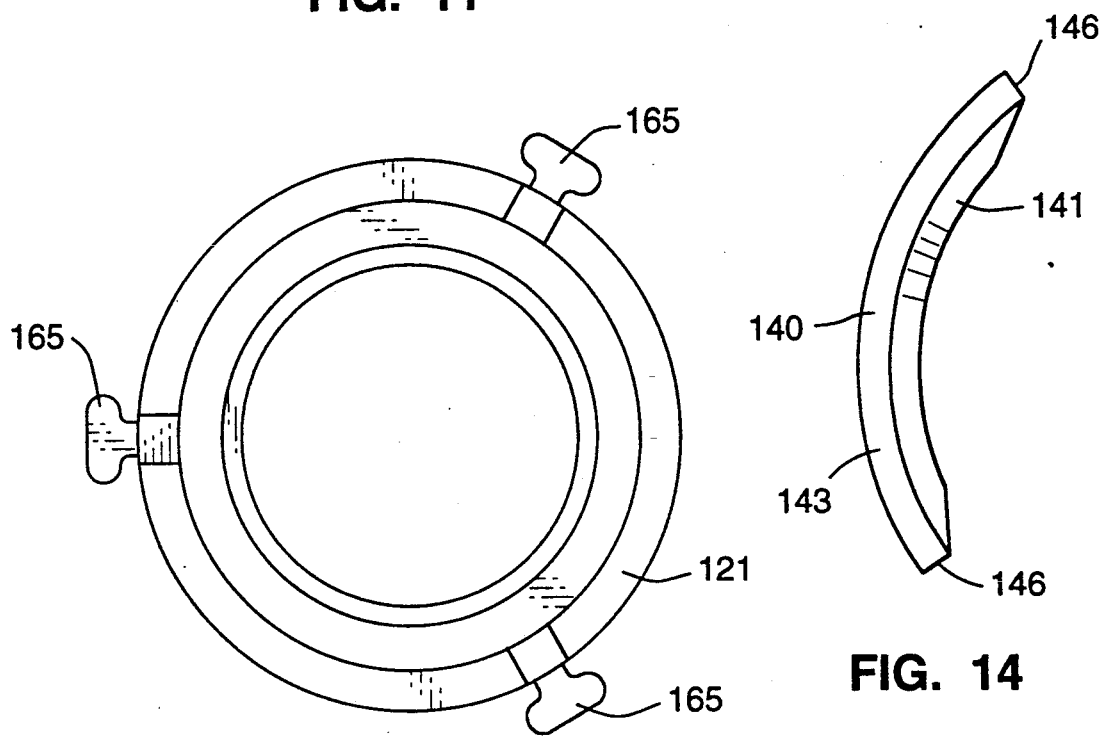
FIG. 12
FIG. 14

QUICK ACTING NUT OR COUPLING ASSEMBLY

This application is a continuation of copending U.S. patent application Ser. No. 07/952,481 filed on Sep. 25, 1992 now abandoned, which is a continuation of copending U.S. patent application Ser. No. 07/788,582 filed Nov. 6, 1991 (now abandoned).

FIELD OF THE INVENTION

This invention relates to threaded fasteners of the type adapted to permit rapid assembly of two threaded members by relative axial movement therebetween, but in which tightening of the threaded members and separation thereof requires the application of relative rotation between the members.

BACKGROUND OF THE INVENTION

In my U.S. Pat. No. 4,378,187 I disclose a quick acting nut assembly having a plurality of internally threaded segments held within a nut casing, the segments being resiliently biased in the radial inward direction. Parallel inclined surfaces on the axial ends of the segments are adapted to slide along similarly inclined surfaces in the interior of the casing. An externally threaded element is received in the bore defined by the segments, to mesh with the threads of the segments.

With this structure, axial forces in one axial direction on the externally threaded element urge the segments in the nut casing radially outward, to permit the threads on the threaded element to step in the axial direction past the threads of the segments, thereby to permit the threaded element to move axially, relatively rapidly and with minimum force. Axial forces on the threaded element in the opposite direction, however, urge the segments radially inward, to enable conventional cooperation between the threads of the segments and the threaded element.

Nut assemblies having split segments with inclined outer surfaces are also disclosed, for example, in U.S. Pat. Nos. 2,021,051 to Desbrueres, 2,896,496 to Jansen, 3,352,341 to Schertz and 3,695,139 to Howe.

In conventional threaded connections, as illustrated in FIG. 16, while the tip to root dimension of the bolt is substantially the same as that of the corresponding nut, the tip diameter of the bolt is substantially less (e.g. 1%) than that of the nut. As a consequence the loading zone of the threads of the nut and bolt is reduced. Since the cross-sectional area of the threads that is subject to shear loads is substantially less than the cross-sectional area at the roots of the threads, the load carrying capacity of the threads is reduced.

SUMMARY OF THE INVENTION

The present invention is directed to the provision of an improved quick acting nut assembly of the above type.

The invention provides a threaded fastener having at least three arcuate circumferentially distributed internally threaded segments arranged to encircle the axis of the fastener. A casing surrounds the segments, and the segments are urged resiliently inwardly. In accordance with one feature of the invention the casing has first and second axially spaced apart radially inwardly directed surfaces of revolution, such as frustoconical surfaces, extending at a common acute angle to the axis of the fastner. In this arrangement, the segments define third and fourth spaced apart radially outwardly directed surfaces of revolution. The third and fourth surfaces of revolution face and axially abut the first and second surfaces of revolution, respectively, in the same axial direction.

In accordance with another feature of the invention, improved holding of the fastener is effected when the acute angle between the surfaces of revolution and the axis of the nut is less than the apex angle of the threads of the segments.

In accordance with a still further embodiment of the invention, the first surface is closer to a first end of said fastener than the second surface, the minimum radial diameter ends of the first and second surfaces are closer to the first end of the fastener than the maximum radial diameter ends thereof, and the minimum diameter end of the second surface has a diameter that is smaller than the diameter of the maximum diameter end of the first surface. This arrangement minimizes the wall thickness required for the casing.

In a still further feature of the invention, the casing has a cover on the end thereof opposite the first end of the casing. The cover has an internal fifth surface of revolution axially spaced from and facing the second surface, and the segments have axial ends toward the opposite end of the casing and defining a sixth surface of revolution facing the fifth surface. The fifth and sixth surfaces of revolution extending at said common angle to the axis of the fastener.

In accordance with another embodiment of the invention, the fastener has at least first and second opposed pairs of segments, and the threads of the two pairs are different. This feature enables the fastener to be employed alternatively with bolts or the like that have different thread characteristics.

The arrangement in accordance with the invention is advantageously employed to couple hollow fittings, such as hose fittings.

The load capacity of the fastener of the invention can be increased by arranging the members to provide substantially full thread contact between the threads of the fastener and the threads of the bolt or the like.

BRIEF DESCRIPTION OF THE DRAWINGS

In order that the invention may be more clearly understood, it will now be disclosed in greater detail with reference to the accompanying drawings, wherein:

FIG. 1 is a cross-sectional view of a nut in accordance with one embodiment of the invention;

FIG. 2 is an enlarged cross-sectional view of a portion of a segment of the nut of FIG. 1;

FIG. 3 is a cross-sectional view of a nut in accordance with another embodiment of the invention;

FIG. 7 is a perspective view of the cover of the nut of FIG. 3;

FIG. 8 is an end view of the nut of FIG. 3 with the cover removed;

FIG. 9 is a view in accordance with FIG. 8, with the segments removed;

FIG. 10 is a perspective view of an anti-rotational element that may be used in the nut of FIG. 3;

FIG. 11 is a partially cross-sectional view of a hose coupling in accordance with another embodiment of the invention;

FIG. 12 is an end view of the hose coupling of FIG. 11;

FIG. 13 is a cross-sectional view of a segment of the hose coupling of FIG. 11;

FIG. 14 is an end view of a segment of the hose coupling of FIG. 11;

DETAILED DISCLOSURE OF THE INVENTION

Figure 4:
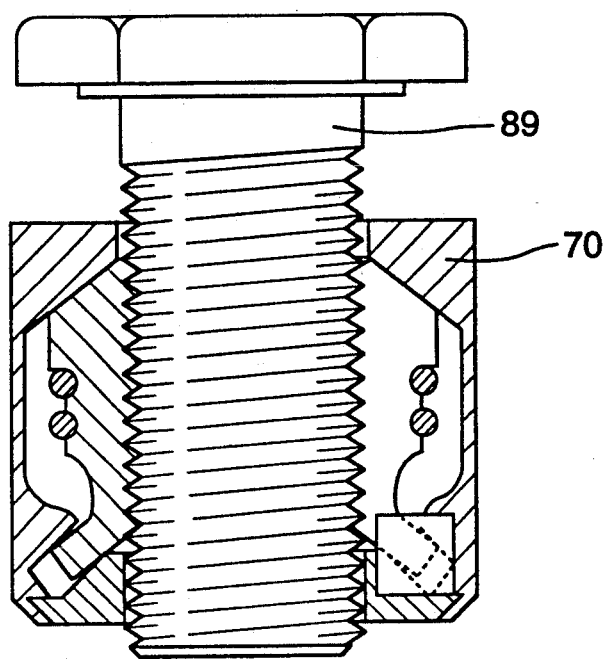
FIG. 4 is a view of the nut of FIG. 3, with a bolt threaded therein.

Referring now to the drawings, and more in particular to FIG. 1, therein is illustrated a nut in accordance with one embodiment of the invention, comprised of an outer casing 10, for example having a hexagonal laterally outer surface 11 adapted to be rotated by a conventional wrench. The interior walls of the casing define a cavity 13 extending therethrough. The lower end of the cavity 13 terminates in a hole 14 extending through one axial end 15 the casing, the hole 14 preferably being round with a diameter slightly greater that the outside diameter of a bolt (not illustrated in FIG. 1) adapted to be received by the nut.

The cavity 13 has a frustoconical surface 20, i.e. a surface of revolution extending at an acute angle $\alpha$ to the axis of the casing, radially outward from the interior of the cavity in the direction toward the end 15 of the casing. The minimum diameter of the inclined surface 20 is preferably the same as that of the hole 14, and this surface 20 may be spaced from the end 15 of the casing by a cylindrical surface 21 of the cavity.

The wall of the cavity extends, in a wall section 25, from the minimum diameter end of the inclined wall surface 20, toward the other end 26 of the casing. The portion of the wall section 25 toward the end 15 of the casing extends in a generally axial direction.

The end of the wall section 25 toward the end 26 of the casing terminates in a second frustoconical wall surface 30. The wall surface 30 extends at the acute angle $\alpha$ to the axis of the nut from the end of the wall section 26, in a radially outward direction. The second frustoconical wall surface 30 terminates, at its radially maximum diameter, in a wall section 31 that preferably extends generally axially (although not necessarily so) to the end 6 of the casing. The wall section 31 may define a shoulder 32 spaced from the end 26 of the casing.

A plurality of internally threaded segments 40 having arcuate cross sections in planes perpendicular to the axis of the nut are positioned within the cavity 13, the segments 40 preferably (although not necessarily) defining generally equal arcs. The circumferential ends 41 of the segments may extend in generally radial planes, and may abut one another in the absence of internal forces on the segments that occur, for example from a bolt threaded therein The segments have internal threads 42 coaxial with the casing 10. The threads 42 have an apex angle $\beta$, as illustrated in FIG. 2.

The axial ends of the segments 40 toward the end 15 of the casing each have a frustoconical surface 45 extending at the acute angle $\alpha$ to the axis of the casing, the surface 45 being adapted to axially abut and slide on the surface 20. The surface 45 extends radially outward, in the direction away from the end 15 of the casing, and terminates in a generally axially extending arcuate wall 47 having an axially length substantially equal to that of the wall section 25 of the cavity 13. The other end of the wall 47 terminates in a further frustoconical surface 50, inclined at the angle $\alpha$ to the axis of the casing, and extending radially outward toward the end 26 of the casing. The frustoconical surface 50 is accordingly adapted to abut and slide on the frustoconical wall surface 30 of the cavity.

The segments 40 are axially retained in the casing 10, at the end 26 thereof, by a cap or cover 51. The cover may be held in place, for example, by fitting the cover against the shoulder 32 in the casing, and spinning over the ends of the terminal wall section of the casing adjacent the end 26 thereof to retain the cover 51 at this position. It is, of course, apparent that the cover may be held in place by any other conventional technique.

The cover has a central hole 52 extending therethrough, preferably of the same diameter as the hole 14. The side of the cover toward the cavity 13, defining the end of the cavity 13, has an outer annular portion 54 axially abutting the shoulder 32, terminating at its radially inner end with a frustoconical surface 55 that is undercut to be inclined at an angle greater than the angle $\alpha$ the axis of the casing. The surface 55 may extend, for example, at an angle $\alpha + 7°$ to the axis of the nut. It will be understood, of course, that the invention is not limited to this specific angle. This undercut, with respect to the angle $\alpha$ provides extra clearance to compensate for radius mismatch. The radially inner end of the frustoconical surface 55 terminates in a cylindrical wall section 56 defining the hole 52.

The ends of the segments 40 toward the end 26 of the casing 10 also have frustoconical surfaces 60, inclined at the angle $\alpha$ to the axis of the casing 10, and facing and adapted to slide on the inclined surface 55 of the cover.

The nut of the invention is further provided with means for resiliently biasing the threaded segments 40 in the radial inward direction. For example, a resilient band or spring 61 may be positioned in circumferentially extending aligned grooves 62 formed in the radial outer walls of the segments It is, of course, apparent that other structures may be provided to serve this function. For example only, resilient C-shaped clips may hold the segments. Alternatively, an axial resilient force may be applied to the segments, urging them toward the end 15 of the casing, so that the frustoconical surfaces in the nut urge the segments radially inward. Such axial resilient forces may be provided by an axially acting spring between the cover and the segments, such as a Belleville spring or a helical spring. Such a spring may be alternatively be provided by forming the axially inner end of the cover with a resilient projection. The invention is not limited to any specific arrangement for resiliently urging the segments radially inward.

In the nut arrangement of FIG. 1, it is also necessary to provide means for inhibiting relative rotation between the casing and segments. For this purpose, for example, pins 65 held in the cover 51 may extend axially inward from the cover 51, into a recess 66 formed by shoulders in adjacent segments at the ends thereof toward the cover. It is generally necessary to employ only one pin per segment. The pins can be a part of the top cap, a part of the outer casing, or a part of the segments. Alternatively, pins or other holding elements can fit in a keyway between adjacent segments, e.g. at the interface of the segments.

In addition to inhibiting relative rotation of the casing and segments, the pins retain the threaded segments from falling out of the nut, and serve as spacers to replace material removed when cutting the threaded segments from a threaded member (not shown) during the fabrication of the segments. The pins prevent the threaded segments from collapsing too far in the inward direction.

In the arrangement of the invention illustrated in FIG. 1, it is apparent that, when a bolt is inserted into the nut via the hole 14, engagement of the threads of the bolt with the threads 42 of the segments causes an axial force to be applied to the segments, thereby resulting in the axial as well as radially outward movement of the segments due to sliding contact between frustoconical surfaces of the segments and the adjacent frustoconical surfaces of the casing. This radial outward movement of the segments permits the bolt to be initially rapidly inserted in the nut, without the necessity of threading the bolt into the nut. The frustoconical surfaces 50 and 60 on the ends of the segments 40 toward the end of the casing 10 are guided, during axial movement of the segments, by the frustoconical surface 30 of the casing and the frustoconical surface 55 of the cover, respectively, in order to inhibit pivotal movement of the segments. Upon rotation of the bolt to tighten it, following the initial axial insertion of the bolt, the threads of the segments engage the threads of the bolt, and are forced axially toward the end 15 of the nut. This results in the segments being guided by the frustoconical surfaces 20 and 30 of the casing to move radially inward, and hence to be forced radially inward against the threads of the bolt. This radial movement of the segments enhances the holding power of the nut if the angle $\alpha$ is less than the apex angle of the threads. Holding power increases as the angle $\alpha$ is reduced.

In accordance with a preferred embodiment of the invention, the acute angle $\alpha$ of the frustoconical surfaces of the casing, cover and segments, with respect to the axis of the nut, is less than the apex angle $\beta$ of the threads of the segments. It has been found that this relationship improves the holding power of the nut, i.e. renders the release of the bolt from the nut more difficult. In other words, the inclined thread surfaces, in an axial plane of the nut, extend at greater acute angles to the axis of the nut than the frustoconical surfaces of the casing, cover and segments. As an example, when a bolt having threads with an apex angle of 60°, it has been found advantageous to form frustoconical surfaces of the casing, cover and segments with angles $\alpha$ of about 45° to the axis of the nut.

In a further embodiment of the invention, as illustrated in FIGS. 3 and 4, the nut casing 70 has an inner chamber 71 with a frustoconical surface 72 extending radially outward from a hole 73 at the end 74 of the nut, to a outer chamber wall 75. As in the arrangement of FIG. 1, a cover 76 is mounted on the other end 77 of the casing, the cover having an internal frustoconical surface 78 positioned to guide the end frustoconical surface 79 of the segments 40. The chamber 71 has a further frustoconical surface 81 facing the surface 78 of the cover, for guiding frustoconical surfaces 82 of the segments 80.

In the arrangement of FIGS. 3 and 4, the inner diameter of the outer chamber wall 75 toward the end 74 of the nut is larger than the inner diameter of this wall at the end thereof abutting the frustoconical surface 82. While this wall 75 may have a generally hour-glass shape as illustrated, it is apparent that the invention is not limited to this specific configuration.

By shaping the wall 75 to have a smaller diameter at the end thereof toward the casing end 77, in accordance with the invention, the overall diameter of the nut may be reduced. Thus, in the arrangement of FIG. 1, since the outer walls of the chamber 13 extend generally axially, it is necessary for the walls of the nut to be sufficiently thick to accommodate the recess formed by the frustoconical surfaces 30 and 55. In the arrangement of FIGS. 3 and 4, however, the recess formed by the frustoconical walls 78, 81 is displaced radially inwardly, so that the central portions of the walls of the chamber can have reduced thicknesses.

FIG. 4 illustrates the nut of FIG. 3, with a bolt 89 threaded therein.

While, in the arrangements of FIGS. 3 and 4 the frustoconical surfaces of the casing, cover and segments are shown to extend at acute angles to the axis of the nut substantially equal to the apex angle of the threads, these surfaces advantageously extend at acute angles to the axis of the nut that are less than the thread apex angles, as described with reference to FIG. 1.

FIG. 3 further illustrates the provision of a notch 90 formed by shoulders on the adjacent facing circumferential ends of the segments 80. As will be discussed, these notches may be employed to cooperate with pins or other retainers, to prevent relative rotation between the casing 75 and the segments. The notches hence cooperate with the pins to serve the above discussed functions of the pins.

Figure 5:
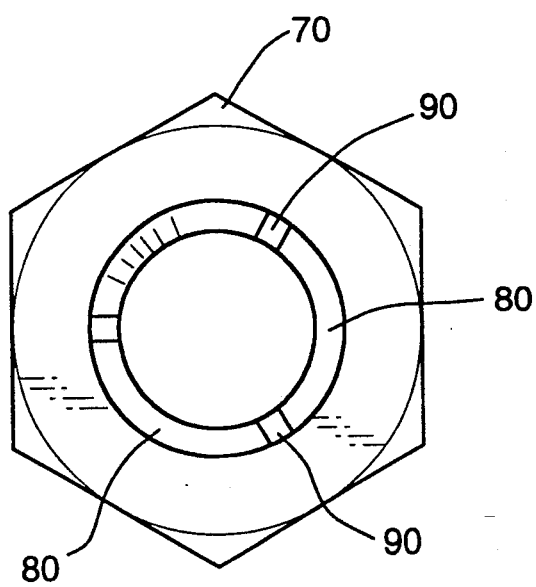
FIG. 5 is an end view of the nut of FIG. 3.
Figure 6:
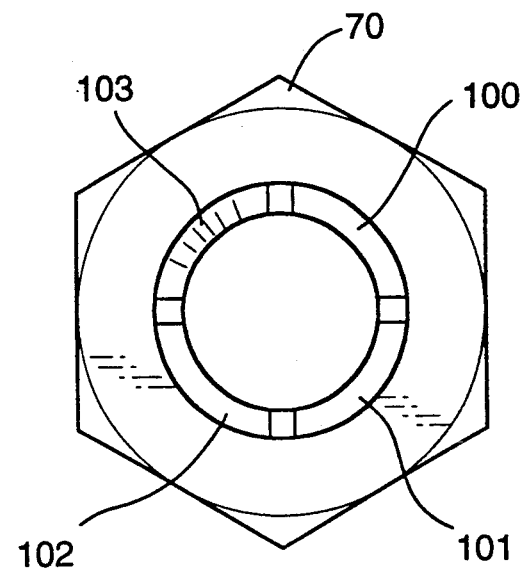
FIG. 6 is an end view of a modification of the nut of FIG. 3.

While at least three segments 80 are provided in the nut, as illustrated in FIG. 5, the invention is not limited to this number. For example, FIG. 6 is an end view of the nut in which the threaded portion is formed by four segments 100, 101, 102, 103 of substantially equal arc length. It is generally advisable to increase the number of segments as a function of the diameter of the bolt that is to be accommodated therein.

In accordance with a further embodiment of the invention, when an even number of segments is provided, on some occasions it may be desirable to form at least one pair of opposed segments, e.g. the segments 100 and 102, with threads of one pitch, and at least another pair of opposed segments, e.g. the segments 101 and 103, with threads of a different pitch. This arrangement provides the advantage that the nut may be alternatively be employed with bolts or other threaded members of different pitch. As will be discussed, this arrangement is of particular importance for use in coupling of fire hoses, wherein there are more than one standard pitches for the fittings of the hoses. By employing the nut of the invention, with plural pitches, fire companies can have reduced equipment costs, as well as savings in time in the coupling of the available hoses.

FIG. 7 is a perspective view of one embodiment of the cover 76 of the nut of FIGS. 3 and 5. This figure illustrates the provision of a plurality of recesses 110 formed in the outer periphery of the frustoconical surface 78. As further illustrated in the end view of FIG. 8, in which the cover of the nut of FIG. 3 has been removed, the recesses 90 formed between adjacent segments are circumferentially aligned with notches 111 in the frustoconical surfaces 81 of the casing. These notches 111 appear more clearly in the end view of FIG. 9, wherein the segments 80 have also been removed. The notches 110 and 111 and recesses 90 are positioned to receive anti-rotation elements 112, for example of a shape as illustrated in FIG. 10. These anti-rotation elements each engage a separate notch 110, a separate notch 111 and a separate recess 90, to prevent any relative rotation of the casing, cover, and segments, irrespective of the axial position of the segments in the casing. The functions of these elements is discussed above. While the elements 112 may have a generally rectangular crosssection, as illustrated, it is apparent that the invention is not limited to this configuration.

As discussed above, however, other holding arrangements may be provided in the nut illustrated in FIGS. 1 and 3, without departing from the broad aspects of the invention.

In a accordance with a further embodiment of the invention, as illustrated in FIGS. 11-14, a quick acting coupling, for example for a fire hose, is comprised of first and second hose fittings 120, 121 adapted to be fitted to respective hoses (not shown) in any conventional manner. The coupling further includes a casing or ring 122 defining an internal chamber 123. The outer wall of the chamber has two concentric frustoconical surfaces 124, 125 that are axially spaced apart and extended at the same acute angle to the axis of the coupling.

The end of the ring 122 toward the fitting 120 is internally threaded to receive a cover 126. The fitting 120 extends into the central bore of the cover, and is rotatably held therein by a ring 130, e.g. a split ring, extending into aligned annular recess in the bore of the cover and in the outer circumference of the fitting 120.

A plurality of internally threaded arc shaped segments 140 is distributed within the circumference of the chamber 123. These segments, as illustrated more clearly in FIGS. 13 and 14, have threads 141 on their concave surfaces (i.e. facing the axis of the coupling). The convex sides of the arcuate segments are provided with axially spaced apart frustoconical surfaces 142, 143 to engage and slide on the frustoconical surfaces 124, 125, respectively, of the ring 122. The angular direction of the surfaces 142, 143, with respect to the axis of the coupling, is hence the same as that of the surfaces 124, 125.

As is the case of the nut of FIG. 1, the arc length of the segments 140 is sufficiently long so that the circumferential ends 146 of the segments can abut one another, under the radial inward force of a spring 147, when the inner diameter of the threads is somewhat less that the outer diameter of the threads 150 of the fitting 121.

Figure 17A:
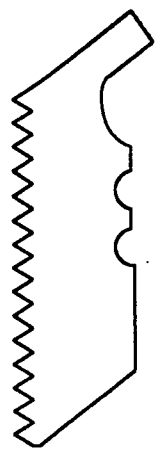
Figure 17B:
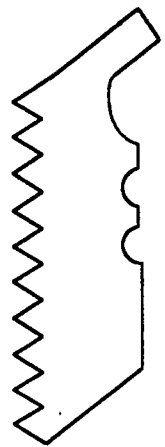
Figure 17C:
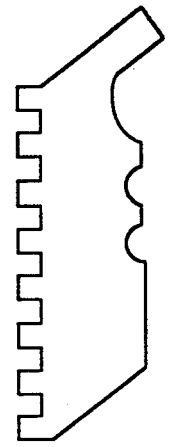

While the coupling of FIGS. 11-14 may have three or more segments, it is preferred that it be provided with at least four segments. It is especially advantageous to provide an even number of segments, arranged with at least one opposite pair of segments having threads of a different pitch or shape than those of at least one other pair of opposite segments. For example, the thread segment shown in FIG. 17a is provided with a different pitch than the thread segment shown in FIG. 17b. Likewise, the thread segment shown in FIGS. 17a and 17b are a different shape (v-shape) than the thread segment shown in FIG. 17c (square). One skilled in the art will recognize at once that threads can differ in many other ways, including, for example, lead, the number of thread (single, double, triple threads), the direction or "handedness" of the thread (right-handed or left-handed), taper, the system used to measure the dimensions of the thread, (metric or American Standard-/unified) and fit (coarse, fine, or extra fine). This arrangement enables the coupling to be employed for use with different fittings that have different threads. These pins are trapped by the surface 124, and serve the same functions as the pins 65, as discussed above with reference to FIG. 1.

As further illustrated in FIG. 11, the segments 140 are held from rotation with respect to the ring 122, by pins 160 fitted in the cover 126 and extending axially between adjacent segments, or in notches formed in the segments. These pins are trapped by the surface 124, and serve the same functions as the pins 65, as discussed with reference to FIG. 1.

As seen in FIGS. 11 and 12, the ring 122 has a plurality of knobs 165 distributed about its radially outer surface, in order to enable a user to rotate the ring with respect to the hose. As in the arrangement of FIG. 1, it is also preferred that the frustoconical surfaces 124, 125, 142, 143 extend at an acute angle to the axis of the coupling that is less than the apex angle of the threads of the segments.

In order to ensure a liquid tight seal between the fittings 120 and 121, an annular seal 148 may be provided between these members, as illustrated in FIG. 11

Figure 15:
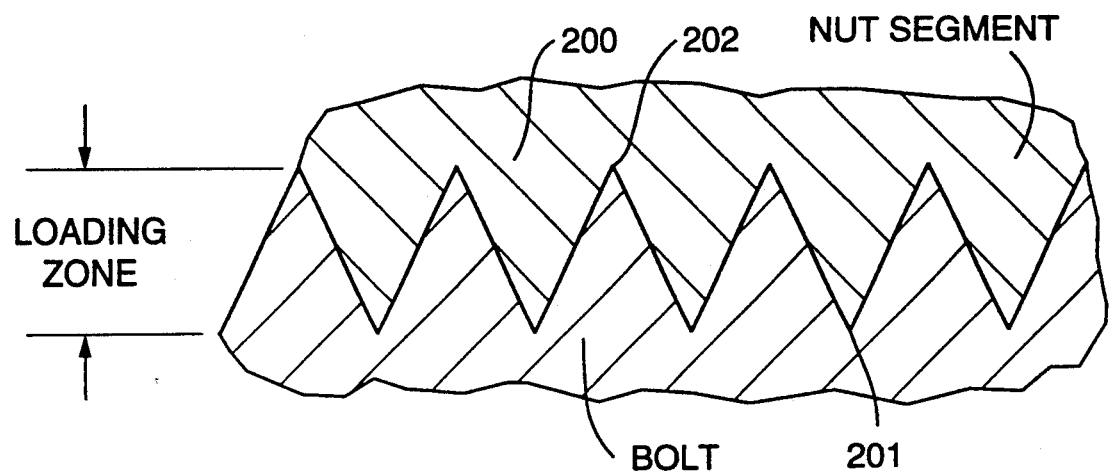
FIG. 15 is a cross-sectional view showing the thread engagement between the segment threads and the bolt.
Figure 16:
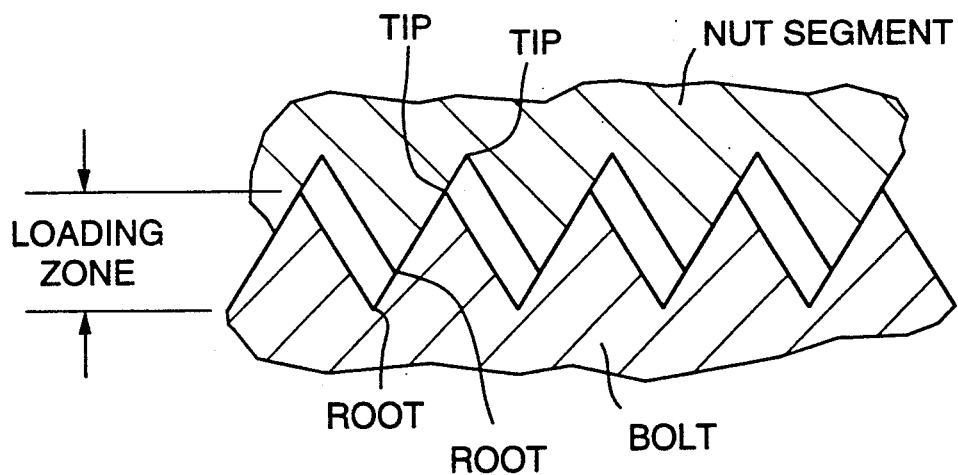
FIG. 16 is a cross-sectional view showing the thread engagement between the threads of a conventional nut and bolt under load; and, FIGS. 17a, b, and c are cross-sectional views showing threaded segments having different threads.

In accordance with a further feature of the invention, as illustrated in FIG. 15, the pitch diameters (the diameter of a theoretical coaxial cylinder that would cut the thread forms at a height where the width of the thread and groove are equal) of the nut segment 200 and the bolt 201 are substantially equal. Since the angle $\alpha$ of the frustoconical wall surfaces of the preferred arrangement of the invention is greater than the apex angle of the threads, axial forces on the segments urge the segments radially inward to maintain the relative alignment between the pitch diameters of the segment and bolt, as illustrated in FIG. 15. As a consequence, the loading zone of the threads is maintained even under loaded conditions. In a conventional nut and bolt combination, however, as seen in FIG. 16, axial forces on the bolt can effect a stretching of the material of the bolt, so that the pitch diameter of the nut increases. As a result, the cross-sectional areas of the nut and bolt subject to shear loading can be substantially decreased, so that the load carrying capacity of a conventional nut and bolt combination can be substantially decreased under loaded conditions. The present invention avoids this disadvantage of conventional arrangements by dimensioning the arc lengths of the segments such that their circumferential ends do not abut when the threads of the segments are in full engagement with the threads of the bolt, and by selecting an angle $\alpha$ that is greater than the apex angle of the threads.

While the invention has been disclosed and described with reference to a number of embodiments, it will be apparent that further variations and modifications may be made therein, and it is therefore intended in the following claims to cover each such variation and modification as falls within the true spirit and scope of the invention.

What is claimed is:

1. A quick acting nut, comprising:
   a casing including a cylindrical open first end having a first circumference, a cylindrical open second end having a second circumference, an inner surface, an outer surface, and an axis passing through the center of said first open end and said second open end, said inner surface including a first frustoconical surface, a second frustoconical surface, and a generally cylindrical surface having a third circumference separating the first and second frustoconical surfaces, said first frustoconical surface extending outwardly away from said first end towards a first end of said generally cylindrical surface, said second frustoconical surface extending outwardly away from a second end of said cylindrical surface towards the open second end, and wherein said first and second ends of said cylindrical surface are axially spaced apart;

at least three arcuate threaded segments arranged within said casing to encircle the axis of the casing, each said segment having a front threaded portion separating two side surfaces, and a back portion having a first bearing surface at one end angled and shaped to substantially conform to said first frustoconical surface and a second bearing surface at an opposite end angled and shaped to substantially conform to said second frustoconical surface, whereby when said first bearing surface is supported on said first frustoconical surface and said second bearing surface is supported on said second frustoconical surface the segments will be substantially evenly distributed circumferentially with the front threaded portions facing the axis;

a spring means for urging said segments radially inward towards said axis; and, a retainer for securing the threaded segments in the casing.

2. The quick acting nut of claim 1 wherein a first angle formed at an intersection of said first frustoconical surface and said axis is the same as a second angle formed at an intersection of said second frustoconical surface and said axis, and wherein said first and second angles are smaller than an apex angle of the threads of said segments.

3. The quick acting nut of claim 1 wherein the side surfaces of any of the threaded segments do not abut the side surfaces of any of the other threaded segments.

4. The quick acting nut claim 1 wherein said retainer includes a cover over the open second end.

5. The quick acting nut of claim 4 wherein said cover includes an opening for the passage of a threaded male fastening component.

6. The quick acting nut of claim 1 wherein said nut has at least two opposed pairs of said segments, and wherein a first opposed pair of segments is provided with a first thread, and a second opposed pair of segments is provided with a second thread, and said first thread and second thread are different.

7. The quick acting nut of claim 6 wherein the first thread is a metric thread and the second thread is a unified screw thread.

8. In a thread fastener assemblage comprising an internally threaded first member and an externally threaded second member, said first threaded member having at least three arcuate circumferentially distributed internally threaded segments arranged to encircle a central, longitudinal axis of the fastener, a casing surrounding said segments and means for resiliently urging said segments radially inward of said fastener, the improvement wherein said second member is hollow, and said second member comprises a hollow end hose fitting and means for rotatably mounting said hollow end hose fitting to said casing, whereby said hollow fitting and second member axially abut one another when said second member is threaded in said first member, and wherein said casing has first and second axially spaced apart radially inwardly directed surfaces of revolution extending at a common acute angle to said axis of the fastener, the segments define third and fourth surfaces of revolution facing and axially abutting said first and second surfaces of revolution, respectively, in the same axial direction.

9. The threaded fastener assemblage of claim 8 wherein said casing comprises a ring having projections extending radially therefrom, for enabling a user to turn said ring.

10. A quick-acting hose coupler, comprising:

a hollow casing including a cylindrical open first end having a first circumference, a cylindrical open second end having a second circumference, an inner surface, an outer surface, and an axis passing through the center of said first open end and said second open end, said inner surface including a first frustoconical surface, a second frustoconical surface and a generally cylindrical surface having a third circumference separating the first and second frustoconical surfaces, said first frustoconical surface extending outwardly away from said first end towards a first end of said generally cylindrical surface, said second frustoconical surface extending outwardly away from a second end of said cylindrical surface, towards the open second end, and wherein said first and second ends of said cylindrical surface are axially spaced apart;

at least three arcuate threaded segments arranged within said casing to encircle the axis of the casing, each said segment having a front threaded portion, two side surfaces, and a back portion having a first bearing surface at one end angled and shaped to conform to said first frustoconical surface and a second bearing surface at an opposite end angled and shaped to conform to said second frustoconical surface, whereby when said first bearing surface of each segment is supported on said first frustoconical surface, the second bearing surface of each segment is supported on said second frustoconical surface, the segments will be circumferentially distributed substantially evenly about the axis with the front threaded portion facing the axis;

a spring means for urging said segments radially inward towards said axis;

a retainer for securing the threaded segments in the casing without substantially obstructing the flow of liquid through the coupler; and, a threaded adapter attached to said second end for free rotation relative to said casing.

11. The quick acting hose coupler of claim 10 wherein said threaded adapter is provided with a female thread for receiving a male threaded hose end, whereby once said coupler is attached to the hose end, the coupler and hose end can be quickly attached to a fire plug outlet.

12. The quick acting hose coupler of claim 10 wherein said threaded adapter is provided with a male thread for receiving a female threaded hose end, whereby once said coupler is attached to said hose end, the coupler and hose end can be quickly attached to a fire plug outlet.

13. The quick acting hose coupler of claim 10 wherein said threaded adapter is provided with a female thread for receiving a male threaded fire plug outlet, whereby once said coupler is attached to said fire plug outlet, a hose end can be quickly attached to the fire plug through said first end of said coupler.

14. The quick acting hose coupler of claim 10 wherein said threaded adapter is provided with a male thread for receiving a female threaded fire plug outlet, whereby once said coupler is attached to said fire plug outlet, a hose end can be quickly attached to the fire plug through said first end of said coupler.

15. The quick acting hose coupler of claim 10 wherein an angle formed at an intersection of said first frustoconical surface and said axis is the same as an angle formed at an intersection of said second frustoconical surface and said axis, and wherein said angle is smaller than an apex angle of the threads of said segments.

16. The quick acting hose coupler of claim 10 wherein the side surfaces of any of the threaded segments do not abut the side surfaces of any of the other threaded segments.

17. The quick acting hose coupler of claim 10 wherein said coupler has at least a first and a second opposed pairs of segments, said first opposed pair of segments being provided with a first thread, and said second opposed pair of segments being provided with a second thread, said first thread and said second thread being different.

18. The quick acting hose coupler of claim 17 wherein said first opposed pair of segments is provided with a unified screw thread and said second opposed pair of segments is provided with a standard pipe thread.

19. The quick acting hose coupler of claim 17 wherein said first opposed pair of segments is provided with a metric thread and said second opposed pair of segments is provided with a United States standard thread.

* * * * *